US005171447A

United States Patent [19]

Kondho et al.

[11] Patent Number: 5,171,447

[45] Date of Patent: Dec. 15, 1992

[54] METHOD OF EXTRACTING AND SEPARATING SPENT SOLVENT GENERATED IN NUCLEAR FUEL CYCLE

[75] Inventors: Isad Kondho, Naka; Takashi Okada, Katsuta, both of Japan

[73] Assignee: Doryokuro Kakunenryo Kaihatsu Jigyodan, Tokyo, Japan

[21] Appl. No.: 729,412

[22] Filed: Jul. 12, 1991

[30] Foreign Application Priority Data

Aug. 14, 1990 [JP] Japan ................................ 2-214661

[51] Int. Cl.[5] ............................................ B01D 11/04

[52] U.S. Cl. .................................... 210/634; 210/907

[58] Field of Search ............... 210/634, 682, 688, 639, 210/681, 906, 907; 252/631, 627

[56] References Cited

U.S. PATENT DOCUMENTS 4,595,529 6/1986 Neace ........................... 210/682 X

*Primary Examiner*—Frank Spear

*Attorney, Agent, or Firm*—Wenderoth, Lind & Ponack

[57] ABSTRACT

A method of extracting and separating a spent solvent generated in a nuclear fuel cycle and containing a phosphate (TBP) and a higher hydrocarbon (n-dodecane). This method comprises bringing the spent solvent into contact with methanol, thereby causing the spent solvent to be separated into a phase mainly composed of the higher hydrocarbon and a methanol phase containing the phosphate. By drying the phase mainly composed of the higher hydrocarbon at a low temperature, a minor amount of methanol contained in the phase is separated through evaporation to recover the higer hydrocarbon. By drying the methanol phase at a low temperature, methanol is recovered through evaporation and the phosphate remains as a remaining solution. The remaining solution may further be subjected to low-temperature vaccum distillation to separate the solution into the phosphate (TBP) and a deterioration product thereof (DBP).

3 Claims, 1 Drawing Sheet

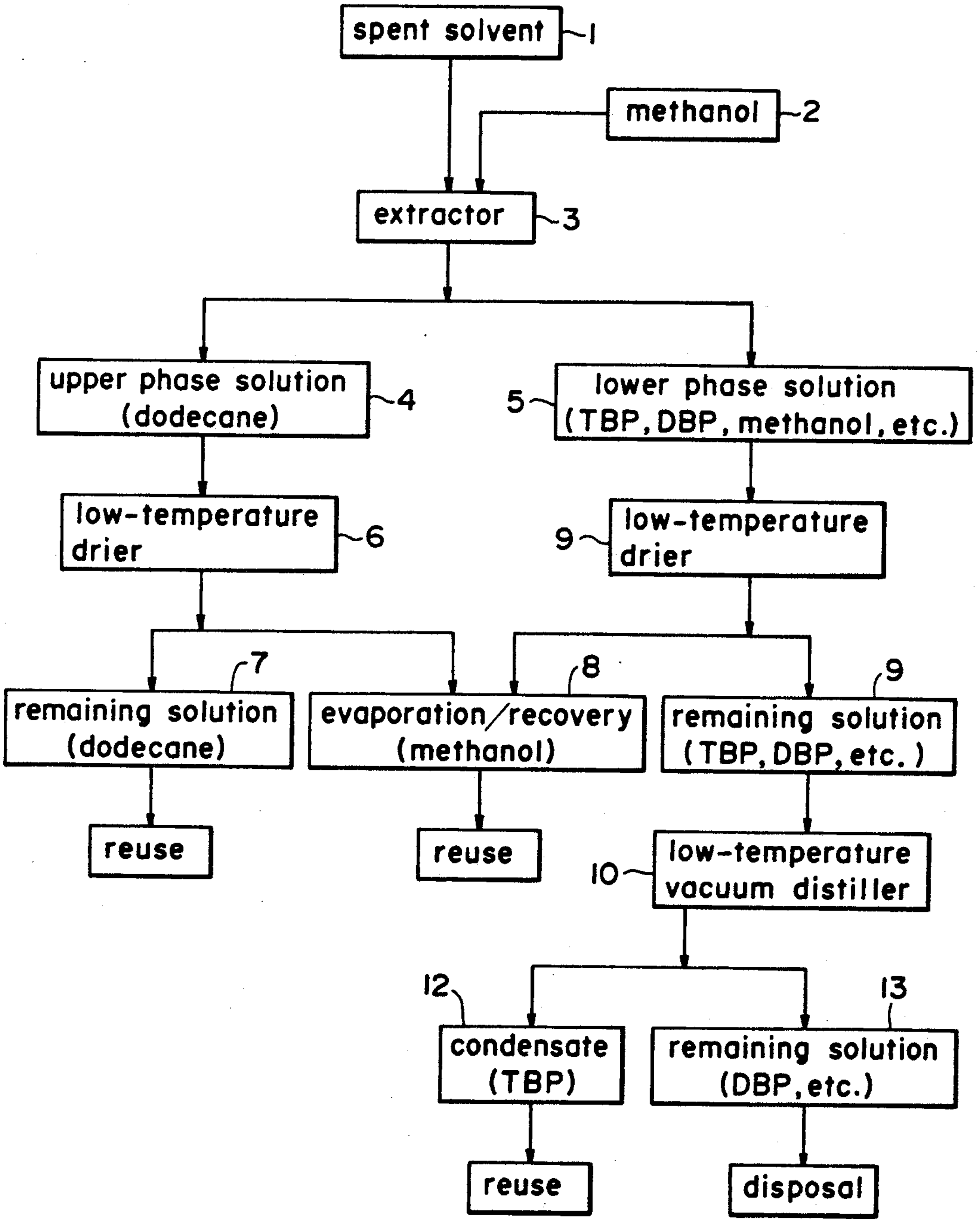
spent solvent
1
methanol
2
extractor
3
upper phase solution (dodecane)
4
lower phase solution (TBP, DBP, methanol, etc.)
5
low-temperature drier
6
low-temperature drier
9
remaining solution (dodecane)
7
evaporation/recovery (methanol)
8
remaining solution (TBP, DBP, etc.)
9
reuse
reuse
low-temperature vacuum distiller
10
condensate (TBP)
12
remaining solution (DBP, etc.)
13
reuse
disposal

METHOD OF EXTRACTING AND SEPARATING SPENT SOLVENT GENERATED IN NUCLEAR FUEL CYCLE

BACKGROUND OF THE INVENTION

The present invention relates to a method of separating and purifying a spent solvent discharged from a solvent extraction process in a nuclear fuel cycle, such as a reprocessing plant of spent nuclear fuel or a nuclear fuel manufacturing plant.

The present invention can preferably be utilized in regeneration and disposal processes of such a spent solvent as described above.

A solvent prepared by diluting a phosphate, such as tributyl phosphate (TBP), with a higher hydrocarbon, such as n-dodecane (hereinafter referred to simply as "dodecane") and kerosine, is widely used in a solvent extraction step of a reprocessing process of spent nuclear fuel or of a wet scrap recovery process in a nuclear fuel manufacturing plant.

The spent solvent generated in the solvent extraction step contains deterioration products, such as dibutyl phosphate (DBP), formed as a result of degradation of a portion of TBP by an acid, heat, radioactive rays, etc. Such deterioration products adversely affect the extraction when the spent solvent is recycled for reuse. Therefore, the deterioration products are removed by alkali washing with an aqueous solution of sodium hydroxide or sodium carbonate. A radioactive waste containing the deterioration products thus removed, such as DBP, is converted into a vitrified solid or a bituminized solid by mixing the same with a vitrification additive or a bituminization additive. However, in order to stabilize large amounts of the sodium component incorporated by the alkali washing, it is necessary to use a large amount of these additives. Consequently, the development of a method of separating and recovering a spent solvent which enables deterioration products, such as DBP, to be removed without using sodium has been desired in the art.

On the other hand, methods such as vacuum freeze-drying and low-temperature vacuum distillation wherein the boiling point difference is utilized have been used as a method of separating TBP, DBP and dodecane from a spent solvent. However, they are disadvantageous in that the treatment capacity is small. Consequently, the development of a separation method having a large treatment capacity for a spent solvent has been desired in the art.

Moreover, when a spent solvent is heated to conduct distillation into components, there occur problems involving the danger of fire and also the danger that volatile nuclides undergo evaporation and sublimation upon heating, thus causing environmental contamination.

In order to eliminate the above-described problems, a proposal has been made on a method of separating and purifying a spent solvent, which comprises treating the spent solvent at a temperature not greater than the freezing point of the higher hydrocarbon but not less than the freezing point of the phosphate to separate the spent solvent into a frozen solid mainly composed of the higher hydrocarbon and a remaining solution containing the phosphate in a higher concentration (see Japanese Patent Application No. 95351/1990). This solvent solidification method, however, requires a high energy due to the necessity of a low temperature not above $-9.6°$ C. which is the freezing point of the dodecane or not below $-80°$ C. which is the freezing point of TBP, so that the treatment capacity cannot be increased to a large extent.

SUMMARY OF THE INVENTION

Accordingly, an object of the present invention is to provide a method of separating and recovering a spent solvent, which can remove deterioration products, such as DBP, without use of reagents, such as sodium, has a large capacity, is free from the danger of fire, etc. and enables the amount of generated radioactive waste to be reduced by virtue of possible recycling of the recovered solvent.

Another object of the present invention is to provide a method of separating and recovering a spent solvent, which can attain energy saving without conducting a solvent freezing treatment which requires a high energy and facilitates a continuous treatment.

In order to accomplish the above-described objects, the method of extracting and separating a spent solvent according to the present invention is characterized by bringing a spent solvent generated in a nuclear fuel cycle and containing a phosphate and a higher hydrocarbon into contact with methanol to extract the phosphate into methanol, thereby causing the spent solvent to be separated into a phase mainly composed of the higher hydrocarbon and a methanol phase containing the phosphate.

As described above, according to the present invention, the phosphates contained in the spent solvent, such as TBP and DBP, are soluble in methanol and the higher hydrocarbon, such as dodecane, is insoluble or hardly soluble in methanol, so that only the phosphates can be extracted into methanol and efficiently separated from the higher hydrocarbon.

The above-described procedure of extraction and separation with methanol can be conducted at room temperature, which contributes to energy saving and a reduction in the cost. Further, the contact of the spent solvent with methanol can easily be conducted in a continuous manner, so that it is possible to improve the treatment capacity.

Thus, the drying of the separated phase mainly composed of the higher hydrocarbon at a low temperature enables a minor amount of methanol contained in the phase to be recovered through evaporation and, at the same time, the higher hydrocarbon to be recovered as a remaining solution. Similarly, the methanol phase containing the phosphates can be dried at a low temperature to recover methanol through evaporation and, at the same time, to recover the phosphates as a remaining solution.

BRIEF DESCRIPTION OF THE DRAWING

The attached drawing is a flow sheet showing an embodiment of the present invention.

PREFERRED EMBODIMENTS OF THE INVENTION

The present invention will now be described in more detail by way of the following embodiment. The attached drawing is a flow sheet showing an embodiment of the present invention. A spent solvent 1 containing dodecane, TBP and the deterioration products of TBP (DBP, etc.) is brought into contact with methanol 2 through the use of an extractor 3 to extract TBP, DBP etc., from the spent solvent 1 into methanol 2. This causes the spent solvent to be separated into an upper phase solution 4 mainly composed of dodecane and a lower phase solution 5 mainly composed of TBP, DBP, etc., and methanol.

The extractor 3 may be an extracting apparatus commonly used in the art, such as a multistage countercurrent distribution extractor or a continuous countercurrent distribution extractor, and a mixer-settler extractor, a pulse column, etc., may also be used as an apparatus for use on a commercial scale. On the other hand, in the case of a batch procedure on a small scale, the extraction can be conducted by mixing the spent solvent and methanol with each other through stirring to sufficiently bring both the spent solvent and methanol into contact with each other and allowing the mixture to stand. In the above-described extraction in a batch manner, the mixing ratio of the spent solvent to methanol is preferably about (1 : 1) to (1 : 2) (in terms of volume ratio).

An example of a experiment of the method of extracting and separating according to the present invention will now be described. 200 ml of methanol was added to 100 ml of a solvent having a dodecane concentration of 70% and TBP concentration of 30% (i.e., comprising 70 ml of dodecane and 30 ml of TBP), and the mixture was stirred and then allowed to stand. As a result, the mixture could be separated into an upper phase solution comprising 2 ml of TBP and 48 ml of dodecane and a lower phase solution comprising 28 ml of TBP, 22 ml of dodecane and 200 ml of methanol. Therefore, this experiment indicates that the percentage extraction of TBP into the methanol phase is 93%.

It has been confirmed that when DBP is contained in a solvent to be extracted, the DBP as well is extracted into the methanol phase.

In the embodiment shown in the drawing, the upper phase solution 4 mainly composed of dodecane obtained by the above-described separation through extraction may further be dried at a low temperature by means of a low-temperature drier 6 to recover through evaporation 8 methanol contained in a minor amount in the upper phase solution 4 while recovering dodecane as a remaining solution 7, and they can be reused according to need. Similarly, the lower phase solution 5 containing methanol, TBP, DBP, etc., may be dried at a low temperature by means of a low-temperature drier 9 to recover methanol through evaporation 8 while recovering TBP, DBP, etc., as a remaining solution 10. The recovered remaining solution 10 containing TBP, DBP, etc., is separated by a low-temperature vacuum distillation apparatus 11 into a condensate 12 comprising TBP and a remaining solution 13 comprising DBP. The TBP condensate 12 is reused according to need while the DBP remaining solution 13 is subjected to recovery of nuclear materials according to need and then to disposal treatment.

As is apparent from the foregoing description, according to the present invention, TBP, DBP, etc., can be efficiently extracted and separated from a spent solvent containing dodecane, TBP, DBP, etc., through the use of methanol. The extraction procedure can be conducted at room temperature, which contributes to energy saving and a reduction in the cost.

Further, in the present invention, the treatment capacity of the spent solvent can be remarkably increased as compared with the conventional method of separating and purifying a spent solvent, such as vacuum freeze-drying, low-temperature vacuum distillation and solvent freezing separation, which facilitates the extraction treatment in a continuous manner. Further, in TBP, DBP, etc., extracted with methanol, DBP, etc., can be separated and removed from TBP by a low-temperature vacuum distillation, etc., without necessity for conducting washing with sodium. As a result, there is no generation of a waste containing sodium, so that it is not necessary to conduct vitrification or bituminization.

Still further, recovered dodecane and TBP can be recycled, so that the amount of generated radioactive waste can be reduced.

What is claimed is:

1. A method of treating a spent solvent generated in a nuclear fuel cycle and containing a phosphate, a deterioration product thereof and a higher hydrocarbon, said method comprising:

brining the spent solvent into contact with methanol to extract the phosphate and the deterioration product thereof into methanol, thereby causing the spent solvent to be separated into a phase composed of the higher hydrocarbon and a minor amount of methanol and a methanol phase containing the phosphate and the deterioration product thereof, drying the phase composed of the higher hydrocarbon and the minor amount of methanol at a low temperature to recover through the evaporation minor amount of methanol and, at the same time, to recover the higher hydrocarbon as a first remaining solution, drying the methanol phase at a low temperature to recover methanol through evaporation and, at the same time, to recover the phosphate and the deterioration product as a second remaining solution, and subjecting the second remaining solution to low-temperature vacuum distillation to separate the solution into the phosphate and the deterioration thereof.

2. The method according to claim 1, wherein the phosphate is tributyl phosphate and the higher hydrocarbon is n-dodecane.

3. The method according to claim 1, wherein the mixing ratio of the spent solvent to methanol is about 1:1 to 1:2 in terms of volume ratio.

* * * * *

UNITED STATES PATENT AND TRADEMARK OFFICE

CERTIFICATE OF CORRECTION

PATENT NO. : 5,171,447

DATED : December 15, 1992

INVENTOR(S) : Isao KONDOH et al.

It is certified that error appears in the above-identified patent and that said Letters Patent is hereby corrected as shown below:

On the title page: Item [75]

change the first inventor's name from "Isad Kondho" to --Isao Kondoh--.

Signed and Sealed this

Twenty-sixth Day of October, 1993

Attest:

BRUCE LEHMAN

*Attesting Officer* *Commissioner of Patents and Trademarks*